United States Patent [19]

Ziegenbein et al.

[11] 4,272,502
[45] Jun. 9, 1981

[54] PROCESS FOR PREPARING GASEOUS HYDROGEN CHLORIDE FROM DILUTE AQUEOUS HYDROCHLORIC ACID

[75] Inventors: Willi Ziegenbein, Marl; Ferdinand Von Praun, Haltern, both of Fed. Rep. of Germany

[73] Assignee: Chemische Werke Hüls Aktiengesellschaft, Marl, Fed. Rep. of Germany

[21] Appl. No.: 152,525

[22] Filed: May 22, 1980

[30] Foreign Application Priority Data

May 30, 1979 [DE] Fed. Rep. of Germany ....... 2921916

[51] Int. Cl.$^3$ .............................................. C01B 7/08
[52] U.S. Cl. .................................... 423/488; 423/481
[58] Field of Search ................................ 423/481, 488

[56] References Cited

U.S. PATENT DOCUMENTS

| 4,115,530 | 9/1978 | Coenen | 423/488 |
|---|---|---|---|
| 4,230,681 | 10/1980 | Coenen | 423/481 |

OTHER PUBLICATIONS

Hickinbottom, *Reactions of Organic Compounds*, 3rd. Edition, Longmans, London (1957) pp. 400–406, 416, 417.
Sidgwick, *The Organic Chemistry of Nitrogen*, 3rd. Edition, Clarendon Press, Oxford (1966), pp. 107, 224, 225, 228, 229.

*Primary Examiner*—Brian E. Hearn
*Attorney, Agent, or Firm*—Gilbert L. Wells

[57] ABSTRACT

Gaseous hydrogen chloride is extracted from dilute aqueous hydrochloric acid using amines, by:
(a) extracting the aqueous hydrochloric acid with an amine or with a mixture of an amine and an inert, water-immiscible solvent having a boiling point of at least 120° C., tertiary alkylamines being used containing 14 to 36 carbon atoms in the nitrogen-bound side chains, the side chains having at most one nitrogen-bound methyl group and at least one nitrogen-bound aliphatic group containing at least 6 carbon atoms, where the amine acid constant is less than $10^{-3}$;
(b) adding an inert, water-immiscible solvent having a boiling point of at least 120° C. to the extract, unless the solvent already was added in stage (a),
(c) distilling the extract, condensing the vapors generated, continuously separating the water from the two-phase condensate and feeding back the organic phase into the distillation procedure;
(d) carrying out an aminohydrochloride cleavage step by distilling the extract at reflux after removing the water and evacuating the gaseous hydrogen chloride released at the head of the column or by separating the hydrogen chloride from the extract after removing the water at less than the boiling point of the solvent by passing an inert gas flow therethrough;
(e) feeding back the solvent containing the amine into the extracting procedure; and
(f) adding carboxylic acid chlorides at least in stoichiometric quantities referred to primary and secondary amines formed from thermal dissociation of the alkylamines, solvent and any impurities before, during or after step (d).

11 Claims, 4 Drawing Figures

PROCESS FOR PREPARING GASEOUS HYDROGEN CHLORIDE FROM DILUTE AQUEOUS HYDROCHLORIC ACID

CROSS-REFERENCE TO RELATED APPLICATIONS

Applicants claim priority under 35 USC 119 for application No. P 29 21 916.7, filed May 30, 1979 in the Patent Office of the Federal Republic of Germany.

The disclosures of Assignee's copending U.S. Patent application of Alfred Coenen et al entitled "Method of Manufacturing Hydrogen Chloride from Solutions of Amine Hydrochlorides," filed Feb. 6, 1979 and having Ser. No. 10,048, now U.S. Pat. No. 4,230,681 and U.S. patent application of Alfred Coenen et al entitled, "Method for Obtaining Gaseous Hydrogen Chloride from Dilute Aqueous Hydrochloric Acid," filed Aug. 9, 1979 and having Ser. No. 64,633 are incorporated herein.

BACKGROUND OF THE INVENTION

The field of the invention is the manufacture of hydrogen chloride and the present invention is particularly concerned with gaseous hydrogen chloride production from dilute aqueous hydrochloric acids.

The state of the art of the manufacture and processing of hydrochloric acid may be ascertained by reference to Kirk-Othmer, "Encyclopedia of Chemical Technology", 2nd ed., vol. 11 (1967) pp. 307-337, particularly pp. 314-315, where it is disclosed that 75% of U.S. hydrochloric acid production for the years 1961-66 came from chlorination processes, and pp. 315-323 under the section Gas Treatment and U.S. Pat. No. 4,115,530, the disclosures of which are incorporated herein.

In many commercial processes, hydrogen chloride is obtained as a by-product in the form of dilute aqueous hydrochloric acids which find industrial application in only a restricted way. In order to make use of this by-product hydrogen chloride which is present in its dilute aqueous form, for instance for the manufacture of vinyl chloride, ethyl chloride, chloroprene or chlorosulfonic acid, the hydrogen chloride must be isolated as a water-free gas.

The recovery of dilute acids required by distillation fails on economic grounds because of the excessive requirements for energy needed to evaporate the water. So far, the isolation of the HCl gas by extraction has failed because of the unfavorable distribution coefficients between HCl and the extracting means, for instance, the pentanols. Extractants with far more advantageous distribution coefficients are amines having substantially long chains. These amines and their hydrochlorides must be water insoluble. With these amines and hydrochlorides it is possible to separate almost completely the hydrogen chloride from dilute hydrochloric acid.

The ensuing thermal dissociation of the water-free aminohydrochlorides so obtained is carried out by the processes described in U.S. Pat. No. 4,115,530 and U.S. patent application Ser. No. 10,048.

The process of U.S. Pat. No. 4,155,530 provides a process for the production of gaseous hydrogen chloride by extracting dilute, aqueous hydrochloric acid with amines wherein:

(a) the aqueous hydrochloric acid is extracted by means of an amine or a mixture of an amine and an inert water-immiscible solvent having a boiling point lower than the amine used, the applicable amines being tertiary alkylamines, tertiary aryldialkylamines, secondary arylalkylamines, primary alkylarylamines or mixtures thereof, containing 14 to 36 carbon atoms in the nitrogen-bound side chains, or which at most one nitrogen-bound methyl group and at least one aliphatic group contains 6 carbon atoms, for which the acid constant $K_a$ of the amine is less than $10^{-3}$;

(b) an inert, water-immiscible solvent having a boiling point lower than that of the amine is added to the extract unless the solvent already was added in stage (a);

(c) the extract is distilled, the vapors generated are condensed, the water is continuously separated from the two-phase condensate and the organic phase is fed back into the distillation process; and (d) after removing the water, the extract is distilled under reflux at sump temperatures between 100° C. and 250° C. and the gaseous hydrogen chloride released at the head of the column is withdrawn.

According to the process of U.S. patent application Ser. No. 10,048, which is not yet part of the state of the art, the gaseous hydrogen chloride is prepared in a variation of the method of U.S. Pat. No. 4,115,530 by heating the mixture of aminohydrochloride and solvent to a temperature below the solvent's boiling point and by separating the hydrogen chloride being released by passing an inert flow of gas therethrough.

The process of U.S. patent application Ser. No. 10,048 includes the steps of:

(a) heating solutions of amine hydrochlorides in an inert, organic essentially non-polar solvent at temperatures of about 120°-230° C., where the solvent has a boiling point at least 20° C. above the temperature of heating;

(b) simultaneously with the heating, passing an inert gas stream through the heated solutions of (a) to split off hydrogen chloride and produce a mixture of hydrogen chloride and the inert gas; and (c) separating the hydrogen chloride from the mixture of (b) wherein the amine components of the amine hydrochlorides are tertiary alkylamines, tertiary aryldialkylamines, secondary arylalkylamines, primary alkylarylamines or mixtures thereof, each of the amine components containing 14 to 36 carbon atoms in the side chains bonded to nitrogen, not more than one of the side chains being a methyl group bonded to nitrogen and at least one of the side chains being an aliphatic radical, bonded to nitrogen, containing at least 6 carbon atoms.

While the two processes of U.S. Pat. No. 4,115,530 and application Ser. No. 10,048 for the first time permit the preparation of hydrogen chloride from dilute aqueous hydrochloric acid with the use of special amines and subsequent thermolysis of the aminohydrochlorides formed, they nevertheless have some limitations. The main disadvantage is that the tertiary aliphatic amine dissociates in a shorter or longer period of time depending on the structure and on the magnitude of thermal loading. This dissociation forms such substances as primary and secondary amines and alkylchlorides and the dissociation efficiency drops thereby. While on the one hand primary and secondary aliphatic amines extract hydrogen chloride well out of dilute hydrochloric acid, on the other hand, they can hardly be dissociated thermally. Therefore, interfering by-products start forming initially in a hardly noticeable manner, but with time they progress ever more increasingly.

A process for preparing economical hydrogen chloride by extraction from dilute hydrochloric acid using amines can be economically implemented, however, only when the comparatively costly amine is recirculated with the least possible losses. This can be achieved for instance by using the method of U.S. patent application Ser. No. 64,633, which is not part of the prior art, by passing at least a portion of the mixture of amine, solvent and any contaminations over an adsorbent prior to use or before it is fed back into the extraction procedure.

Adsorptive amine purification, however, is costly on a commercial scale.

SUMMARY OF THE INVENTION

Having in mind the limitations of the prior processes, it is an object of the present invention to provide a more economical process for preparing gaseous hydrogen chloride by extracting dilute hydrochloric acid with tertiary aliphatic amines followed by dissociating the aminohydrochloride. The formation of undesired decomposition products is either prevented or widely suppressed in the process of the present invention.

According to the present invention, a process for preparing gaseous hydrogen chloride by extracting dilute aqueous hydrochloric acid with amines is improved by:

(a) extracting the aqueous hydrochloric acid with an amine or with a mixture of an amine and an inert, water-immiscible solvent having a boiling point of at least 120° C., tertiary alkylamines being used containing 14 to 36 carbon atoms in the nitrogen-bound side chains, and among these, at most one nitrogen-bound methyl group and at least one nitrogen-bound aliphatic group containing at least 6 carbon atoms and wherein the amine acid constant is less than $10^{-3}$;

(b) adding an inert, water-immiscible solvent having a boiling point of at least 120° C. to the extract, unless the solvent has already been added in stage (a);

(c) distilling the extract, condensing the vapors generated, continuously separating the water from the two-phase condensate and feeding back the organic phase into the distillation procedure;

(d) carrying out an aminohydrochloride cleavage step by distilling the extract at reflux after removing the water and evacuating the gaseous hydrogen chloride released at the head of the column or by separating the hydrogen chloride from the extract after removing the water at less than the boiling point of the solvent by passing an inert gas flow therethrough;

(e) feeding back the solvent containing the amine into the extracting procedure; and (f) adding carboxylic acid chlorides at least in stoichiometric quantities referred to primary and secondary amines formed from thermolysis of the mixture of tertiary alkylamines, solvent and any impurities prior to being subjected to extraction or after the dehydration of the extract and before there is aminehydrochloride cleavage.

The object of the present invention is achieved by using highly pure tertiary amines in step (a) and by adding a carboxylic acid chloride to the amine-solvent mixture as soon as there are minute amounts of primary and secondary amines or of their hydrochlorides to prevent the accumulation of admixtures and dissociation products and in order that these so-called decomposition amines be rendered extensively innocuous in the form of their amides.

BRIEF DESCRIPTION OF THE DRAWINGS

The drawings are flow sheets which show embodiments of the present invention and their modifications of the processes of U.S. Pat. No. 4,115,530 and U.S. Patent application Ser. No. 10,048.

DESCRIPTION OF THE PREFERRED EMBODIMENTS

Figure 1:
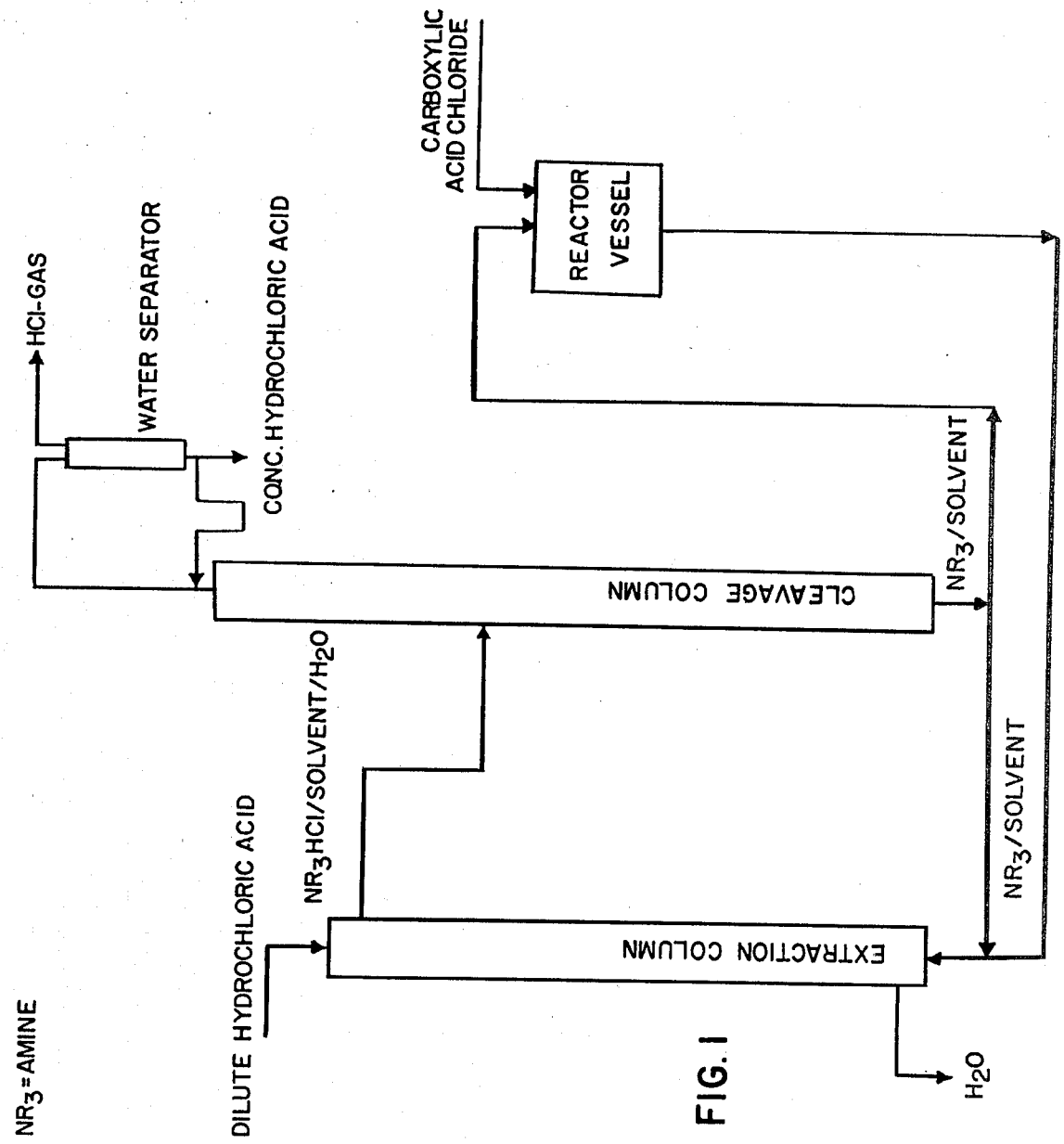
FIG. 1 is a flow sheet showing an embodiment of the present invention over the process of U.S. Pat. No. 4,115,530 where acid chloride is added after aminohydrochloride dissociation.

The amines suitable for the process of the present invention are tertiary alkylamines having 14 to 36 carbon atoms in the nitrogen-bound side chains. One of these side chains must contain at least 6 carbon atoms, that is, it must be a cyclohexyl, hexyl or isohexyl group, and the amino group may contain at most one methyl group.

In order to ensure adequate extraction of the hydrogen chloride, the dissociation constant $K_a$ of the following equilibrium reaction

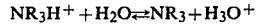

must be less than $10^{-3}$. The dissociation constants for many amines are disclosed in the relevant literature, for instance the "Handbook of Chemistry & Physics," 51st ed. (1970-71), page D 117 ff.

Suitable amines for the present invention include trihexylamine, tricyclohexylamine, triheptylamine, trioctylamine, cyclohexyl-diisooctylamine, cyclohexyl-4-heptyloctylamine, cyclohexyl-2-ethylhexyloctylamine, 2-ethylhexyl-4-heptyloctylamine, tri-2-ethylhexylamine, di-2-ethylhexyl-methylamine, didecylethylamine, tridodecylamine, dodecyl-dibutylamine, dodecyl-diisobutylamine, dodecyl-isobutylmethylamine, diisopentadecyl-methylamine, diisopentadecyl-ethylamine, diisopentadecylisopropylamine, didoceyl-methylamine and dodecyl-diisopropylamine.

Organic liquids are used as the solvents for the amines and these solvents are inert with respect to water, hydrogen chloride, amines and thermal loading under the conditions of the present process.

Compounds as non-polar as possible are especially suited for the process, for instance aromatic and aliphatic hydrocarbons such as xylenes, cumol, cymols, ethylbenzene, trimethylbenzenes, 1,2,4-triethylbenzene, 1,3,5-triethylbenzene, 1,2,3,4-tetramethylbenzene, 1,2,3,5-tetramethylbenzene, 3-phenylpentane, dodecylbenzene, nonane, decane, undecane, dodecane, tetradecane, decalin and tetralin. The appropriate concentration of the amine in the solution depends on the kind of amine and the quantity of the impurities which must be separated. As a rule the ratio of amine to solvent will be from about 1:1 to about 1:10.

Preferred suitable acid chlorides are those having straight-chain or branched saturated aliphatic carboxylic acids containing from 2 to 22, preferably 6 to 18 carbon atoms in the molecule. Furthermore, acid chlorides having aryl-substituted saturated fatty acids as well as acid chlorides having aromatic carboxylic acids each containing from 7 to 15 carbon atoms in the molecule are useful. Suitable acid chlorides include but are not limited to acetic acid chloride, propionic acid achloride, butyric acid chloride, isobutyric acid chloride, valerianic acid chloride, isovalerianic acid chloride, pivalic acid choride, capronic acid choride, heptoic acid chloride, caprylic acid chloride, 2-ethylhexanoic acid chloride, pelargonic acid chloride, capric acid chloride, lauric acid chloride, myristic acid chloride, palmitic acid chloride, stearic acid chloride, benzoic acid chloride, toluyl acid chlorides, ethylbenzoic acid chlorides, dimethylbenzoic acid chlorides, trimethylbenzoic acid chlorides, tetramethylbenzoic acid chlorides, 1-naphthoic acid chloride, 2-naphthoic acid chloride, phenyl-acetic acid chloride tolyl-acetic acid chloride, beta-phenylpropionic acid chloride, gamma-phenylbutyric acid chloride, delta-phenyl-valerianic acid chloride and beta-1-naphthyl-propionic acid chloride, arachidic acid chloride and behenic acid chloride.

The inactivation of the decomposition amines can also be carried out using carboxylic acid anhydrides and carboxylic acids, though not as effectively as when carboxylic acid chlorides are used.

Figure 2:
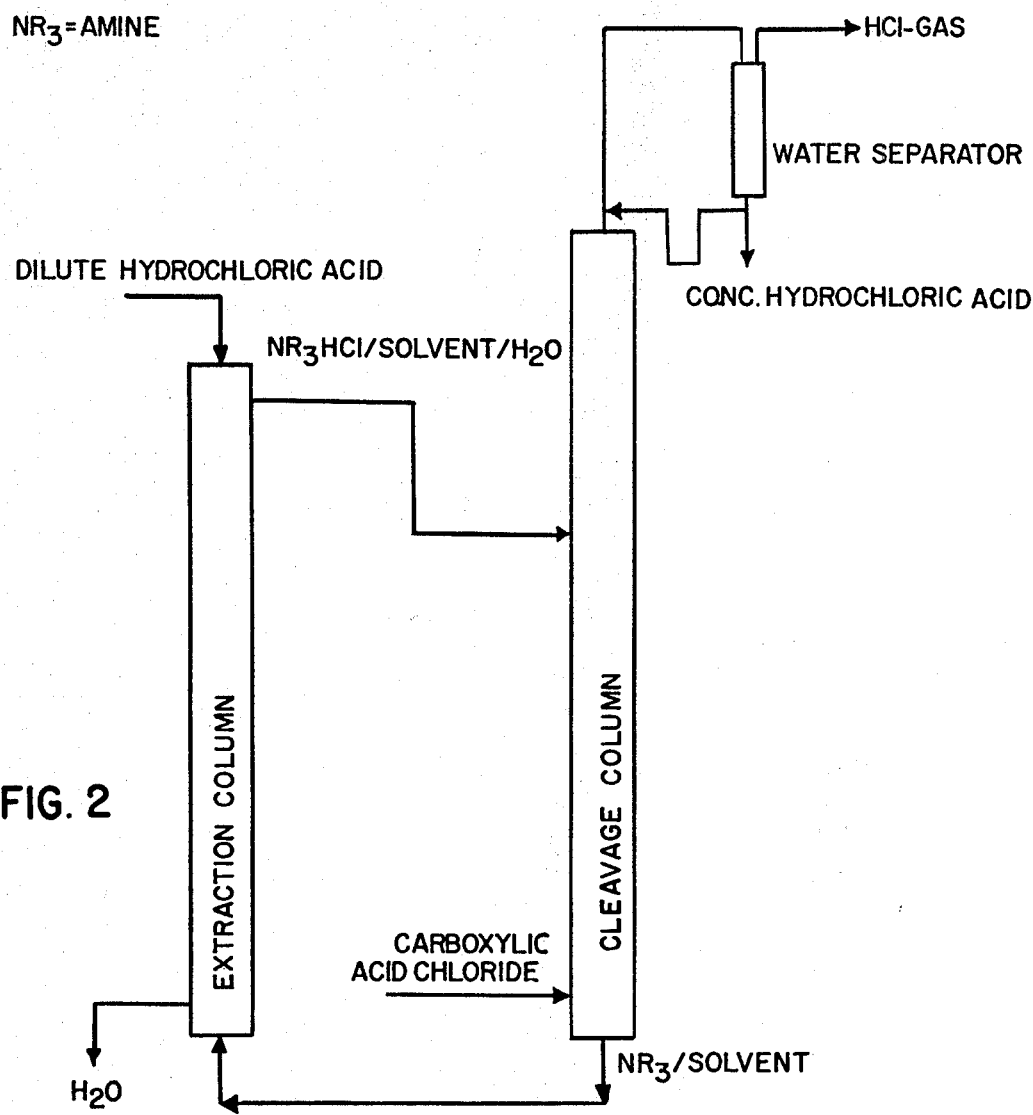
FIG. 2 is another embodiment of the present invention where acid chloride is added to the cleavage column of the process of U.S. Pat. No. 4,115,530.
Figure 3:
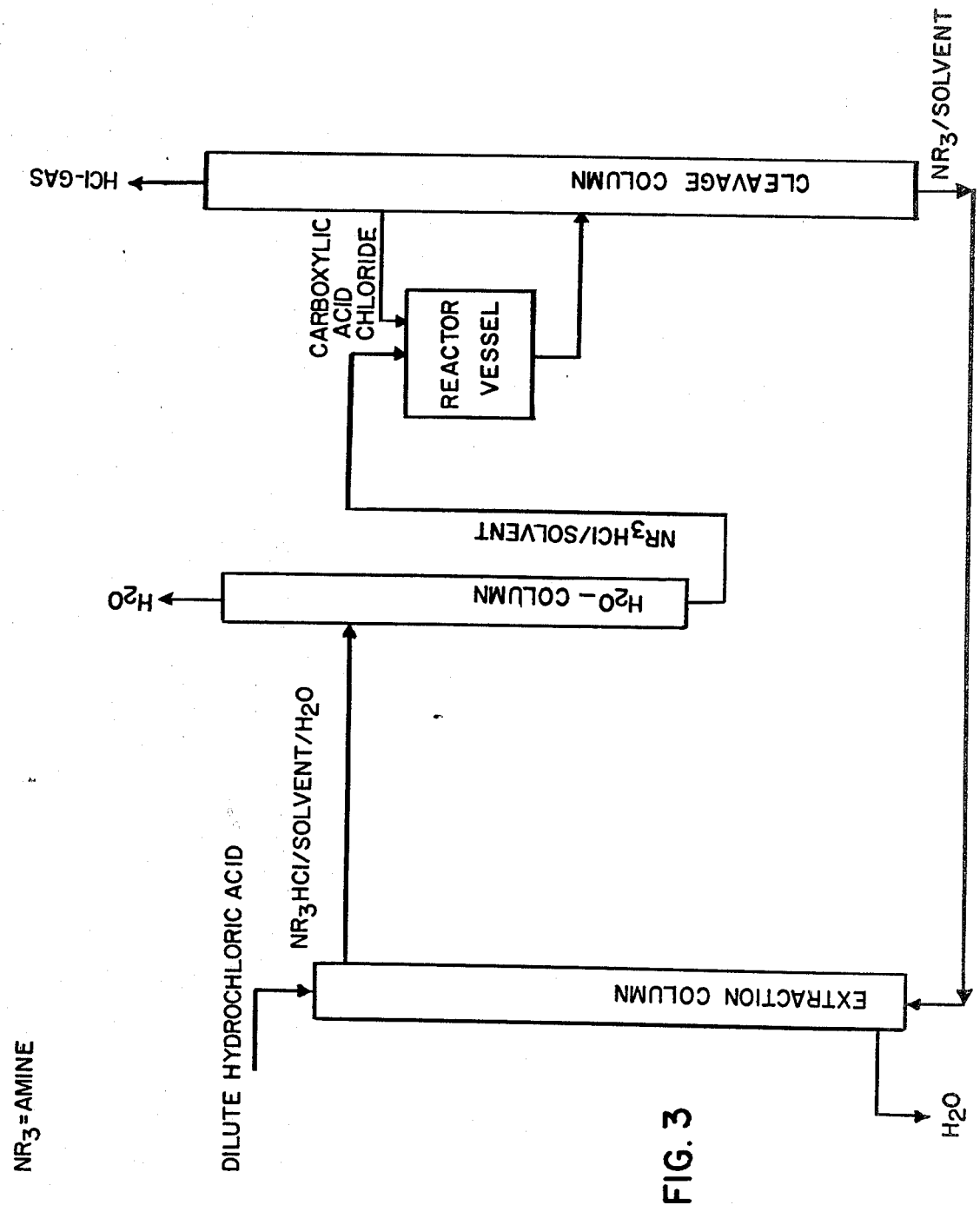
FIG. 3 is yet another embodiment of the present invention where acid chloride is added before the aminohydrochloride dissociation of the process of U.S. Pat. No. 4,115,530.

As a rule, the process of the present invention, in particular acylating the primary and secondary amines of their hydrochlorides, is carried out in a reaction vessel after the cleavage column as shown in FIG. 1, stirring taking place in the reaction vessel following addition of at least the stoichiometric quantity of acid chloride at room temperature (15°–30° C.) for a short time, generally not more than one hour. Another embodiment, as shown in FIG. 2, consists in directly feeding the acid chloride to the distillation bell of the cleavage column where instantaneous reaction takes place at high temperatures prevailing there (exceeding 100° C.). A third embodiment furthermore is to treat the dehydrated extract with acid chloride as shown in FIG. 3 in the manner described for the first embodiment before it is subjected to cleavage.

Figure 4:
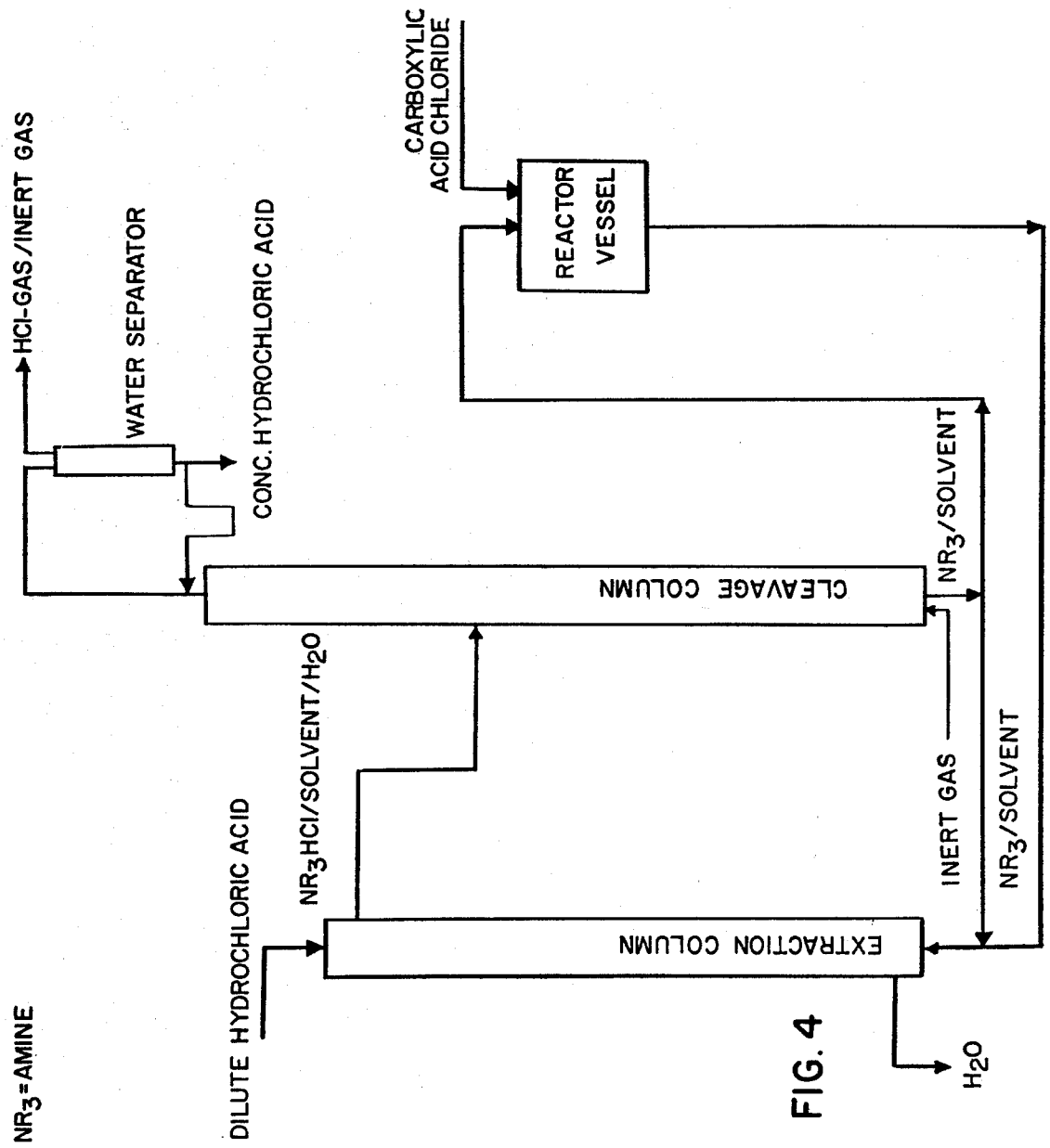
FIG. 4 is a flow sheet which shows one embodiment of the present invention which is a modification of the process of U.S. patent application Ser. No. 10,048.

Although only the first embodiment of the present modification of the process of U.S. patent application Ser. No. 10,048 is shown in FIG. 4, it is possible to employ the embodiments of FIGS. 2 and 3 where acid chloride is added during and before cleavage, respectively, to the process of U.S. patent application Ser. No. 10,048.

The process of the present invention can be carried out both continuously and discontinuously.

An essential advantage of the process of the present invention is that in addition to averting amine losses, the implementation of the HCl extraction and the hydrochloride dissociation is possible for the first time with less stable amines, as was discovered for example, with the trioctylaminedodecane system. In other cases there is much more temperature latitude, namely from 100° to 300° C., within which the dissociation can be carried out economically.

Obviously corresponding extracts obtained in a manner other than by extracting aqueous hydrochloric acid can also be dissociated into hydrogen chloride and amines by the method of the present invention.

The process of this invention is particularly suitable for obtaining hydrogen chloride from hydrochloric acid solutions from which gaseous hydrogen chloride cannot be produced by distillation under normal conditions, i.e., for hydrochloric acid solutions lower than 20%. These solutions can furthermore contain inorganic neutral salts; the electrolyte effect of such salts can improve the distribution of the hydrogen chloride between the aqueous phase and the organic phase in favor of the process and can also accelerate the phase separation after the intermixing in the extraction stage.

The hydrochloric acid solutions used in the present invention have a hydrochloric acid concentration of about 2 to 20 percent by weight and preferably about 5 to 15 percent by weight.

The process of the invention is explained in relation to the drawings and the examples and control examples given below.

Unless otherwise indicated, all percentage data is by weight.

It is the purpose of Control Examples A and B to show by comparison tests that when seondary aminohydrochloride is added to tertiary aminohydrochloride, an autocatalytic dissociation of the tertiary amine is observed in thermolysis.

CONTROL EXAMPLE A 77.9 g (0.2 moles) of tri-(2-ethyl-hexyl)-aminohydrochloride are dissolved in xylene of the same amount by weight in a 500 ml three-neck flask equipped with a gas intake tube, a thermometer and water separator with attached reflux condenser. By immersing the flask in an oil bath preheated to 220° C., the flask's contents are rapidly made to boil, a uniform flow of 30 l/h of nitrogen being applied. The dissociating hydrogen chloride is collected in two sequentially arranged flasks filled with sodium hydroxide and determined titrimetrically. In the course of 6 hours 97.3% of the theoretically possible amount of hydrogen chloride was dissociated from the amine hydrochloride. After being treated with sodium hydroxide solution, the sump product is tested for its composition by gas chromatography. Less than 0.1% of secondary amines is found as a dissociation product.

CONTROL EXAMPLE B 77.9 g (0.2 moles) of tri-(2-ethylhexyl)-aminohydrochloride dissolved in the same amount by weight of xylene is added to the apparatus of Control Example A and following this addition, 7.8 g (0.028 moles) of di-(2-ethylhexyl)-aminohydrochloride are added in 78 g of xylene and subjected to thermolysis as in Control Example A. In the course of 6 hours 92.7% of the theoretical quantity possible of hydrogen chloride is dissociated. Following treatment with sodium hydroxide solution, the sump product contains 84.9% of tri(2-ethylhexyl)-amine and 14.1% of di-(2-ethylhexyl)-amine, calculated for no solvent. As the input product contained 8.8% of secondary amine, there was therefore a formation of 5.3% of dissociation product during the hydrochloride dissociation.

EXAMPLE 1

The example is carried out in a continuously operating facility for extracting hydrochloric acid by means of amines and dissociating the aminohydrochlorides formed as in FIG. 2. The extracting column consists of a column of 20 mm diameter and 0.5 m high filled with 4 mm Raschig rings, wherein a mixture of solvent and amine flows in opposition to hydrochloric acid flowing from top to bottom. The extract containing hydrochlorides is removed at the top of the extraction column and fed into the cleavage column (height—1,500 mm, diameter=20 mm). The water entrained with the extract is removed from circulation at the head of the cleavage column in the form of concentrated hydrochloric acid, the solvent acting as the water-entraining means (the removal of the water without thereby incurring a loss of HCl can take place in a prior distillation stage). The hydrogen chloride obtained in the dissociation of the aminohydrochloride is evacuated through the head of the column and passes to a water separator before being collected. The HCl-free mixture of amine and solvent is removed from the sump of the cleavage column through a condenser and reintroduced into the extraction procedure. The content in primary and seondary amines in the mixture of amine and solvents of the sump of the cleavage column is ascertained by gas chromatography at specific time intervals, and at least the stoichiometric quantity of acid chloride required to inactivate the dissociated amines is added to the sump of the cleavage column of FIG. 2. The apparatus of FIG. 2 is operated in an ambience of nitrogen as a protective gas.

19,105 g of 10.7% hydrochloric acid containing cooking salt were extracted in countercurrent at 55° C. in 298 hours at a rate of 60 ml/h using a mixture of 345 g of tri(2-ethylhexyl)-amine and 345 g of 5-tert.-butyl-m-xylene at a rate of 250 ml/h. The extract was subjected in the cleavage column of FIG. 2 to hydrochloride dissociation at 228° C. to 232° C. and a total of 1,874 g of hydrogen chloride supplied, was obtained as one third concentrated hydrochloric acid besides gaseous hydrogen chloride. As the dissociation took place practically quantitatively, an extraction rate of 91.7% is calculated for the cited HCl amounts.

The content in primary and secondary amines was constantly determined in the mixture of amine and solvent in the reflux of the cleavage column for the purpose of inactivating the dissociating amines. After reaching a value of about 0.2% of dissociated amines, the stoichiometric quantity of acetyl chloride was added to the sump of the cleavage column. In the course of the example, the dissociation amines recurring at given time intervals were made inactive by a total of 1.3 g of acetyl chloride.

After termination of the example, 299.7 g of 345 g of tri-(2-ethylhexyl)-amine were recovered unaltered and this corresponds to a loss of 45.3 g or 13.1%. Referred to the hydrogen chloride generated, the amine loss is calculated to be 2.4%.

EXAMPLE 2

Using the apparatus of FIG. 2 and Example 1, 24,901 g of 9.5% hydrochloric acid containing cooking salt were extracted in 348 hours (at a rate of 60 ml/h) using a mixture of 358 g of tri-(2-ethylhexyl)-amine and 360 g of 5-tert.-butyl-m-xylene (at a rate of 250 ml/h), the extraction taking place in countercurrent and at 70° C. Following the hydrochloride dissociation, the extract supplied 2,086.5 g of hydrogen chloride. As the dissociation took place practically quantitatively, the extraction rate was calculated to be 88.2%.

The dissociation amines were inactivated in the manner described in Example 1 using caprylic acid chloride, a total of 2.9 g of the acid chloride being added to the reaction mixture in the sump of the cleavage column.

291.1 g of 358 g of tri-(2-ethylhexyl)-amine are recovered unaltered upon example completion and this corresponds to a loss of 66.9 g or 18.7%. Referred to the hydrogen chloride generated, the amine loss is calculated to be 3.2%.

EXAMPLE 3

In the apparatus of FIG. 2 and Example 1, 18,860 g of 11.2% hydrochloric acid containing cooking salt are extracted at 60 ml/h and 70° C. for 307 hours using a mixture of 250 ml/h of 350 g of tri-(2-ethylhexyl)-amine and 350 g of 5-tert.-butyl-m-xylene, extraction taking place in countercurrent. After hydrochloride dissociation, the extract supplied 1,911 g of hydrogen chloride. As the dissociation takes place practically quantitatively, the calculated extraction rate is 90.5%.

The inactivation of the dissociation amines is carried out in the manner described in the previous examples using stearoyl chloride and over the time of the example, a total of 4.7 g of the acid chloride was added to the sump of the cleavage column. After completion of the example, 298.6 g of 350 g of tri-(2-ethylhexyl)-amine are recovered unaltered. This corresponds to a loss of 51.4 g or 14.7%. Referred to the hydrogen chloride generated, the amine loss is calculated to be 2.7%.

CONTROL EXAMPLE C

In the apparatus of FIG. 2 and Example 1, 15,370 g of 10.8% hydrochloric acid containing cooking salt are extracted at a rate of 60 ml/h in 259 hours in countercurrent at a temperature of 70° C. using a mixture of 358 g of tri-(2-ethylhexyl)-amine and 366 g of 5-tert.-butyl-m-xylene at 250 ml/h. Following the hydrochloride dissociation, the extract supplies 1,060 g of hydrogen chloride. As the dissociation takes place quantitatively, the calculated extraction rate is 63.9%.

In this control example the dissociation amines are not inactivated by acylation. Following completion of the example, only 35.1 g of 358 g of tri-(2-ethylhexyl)-amine could be recovered unaltered and this is a loss of 322.9 g or 90.2%. Referred to the hydrogen chloride produced, an amine loss of 30.5% is calculated.

EXAMPLE 4

This example is carried out according to FIG. 1 with a column 30 mm in diameter, 2.5 m high and filled with 4 mm glass spheres used as the extraction column and the hydrochloride dissociation is carried out in a cleavage column 2 m high with a diameter of 40 mm. The inactivation of the dissociation amines takes place at room temperature by continuously dosing the acid chloride into the mixture of amine and solvent which to that end flows through a stirred reactor vessel after the sump of the cleavage column.

78,700 g of 10.1% hydrochloric acid containing cooking salt are extracted at 70° C. in countercurrent at a rate of 250 ml/h using a mixture of 1,250 g of trioctylamine and 5,000 g of dodecane at a rate of 850 ml/h. The extract is subjected to the hydrochloride dissociation in the cleavage column of FIG. 1 at a temperature of 228°-230° C. It provides a total of 5,375 g of hydrogen chloride obtained in gaseous form in an amount of 45% and as concentrated hydrochloric acid in an amount of 55%. As the dissociation is nearly quantitative, the HCl amounts indicated result in an extraction rate of 67.6% by calculation.

A total of 316.8 g of stearoyl chloride are added over the duration of the example to the mixture of amine and solvent for the purpose of inactivating the dissociation amines. Upon completion of the example, 823.9 g of 1,250 g of trioctylamine are recovered unaltered and this corresponds to a loss of 426.1 g of 34.1%. Referred to the hydrogen chloride produced, the amine loss is calculated as 7.9%.

CONTROL EXAMPLE D

A 10% hydrochloric acid containing cooking salt is extracted in countercurrent at 70° C. using a mixture of 1,250 g of trioctylamine and 5,000 g of dodecane in the apparatus of FIG. 1 and Example 4 without the reactor vessel.

The extract was subjected to the hydrochloride dissociation at 227° C. No inactivation of the dissociation amines was carried out. The example had to be abandoned after 18 hours because the conduits and the extracting column were clogged by the ample dioctylaminohyrochloride formed.

We claim:

1. In a process for the production of gaseous hydrogen chloride by extraction of dilute aqueous hydrochloric acid with amines, comprising:
   (a) aqueous hydrochloric acid with an extractant selected from the group consisting of a tertiary alkyl amine which contains 14 to 36 carbon atoms in the nitrogen-bound side chains, and among these at most one is a nitrogen-bound methyl group and at least one is an aliphatic group containing at least 6 carbon atoms, and wherein the acid constant $K_a$ of the tertiary amine is smaller than $10^{-3}$, or a mixture of said tertiary amine and an inert organic solvent which is immiscible with water and has a lower boiling point than said tertiary amine to form a two-phase condensate comprising a water phase and an organic phase containing aminohydrochlorides;
   (b) separating said water phase from said organic phase;
   (c) liberating gaseous hydrogen chloride from said separated organic phase by thermolysis of said aminohydrochlorides and formation of said tertiary amines and primary and secondary amine decomposition products of said tertiary amines; and
   (d) recirculating said tertiary amines of step (c) to said extracting step (a); the improvement comprising:
   (e) adding carboxylic acid chlorides in at least stoichiometric quantities to said primary and secondary amines to form their amides.

2. The process of claim 1, wherein step (c) is carried out in a distillation column under reflux at sump temperatures of between about 100° C. and 300° C. and gaseous hydrogen chloride liberated at the head of the column is withdrawn.

3. The process of claim 1, wherein step (c) is carried out by heating said separated organic phase at temperatures of about 100°–250° C. with said solvent having a boiling point at least 20° C. above the temperature of heating and passing an inert gas stream through said heated separated organic phase.

4. The process of claim 1, wherein step (e) is carried out before step (c).

5. The process of claim 1, wherein step (e) is carried out simultaneously with step (c).

6. The process of claim 1, wherein step (e) is carried out after step (c).

7. The process of claim 1, wherein said solvents are straight-chain or branched aliphatic, cycloaliphatic or aromatic hydrocarbons boiling above 120° C. which are totally or extensively nonpolar and contain at least 6 to 20 carbon atoms.

8. The process of claim 1, wherein said carboxylic acid chlorides are linear and branched aliphatic carboxylic acids containing 2 to 22 carbon atoms in the molecule.

9. The process of claim 1, wherein said tertiary amines are selected from the group consisting of trihexylamine, tricyclohexylamine, triheptylamine, trioctylamine, cyclohexyl-diisooctylamine, cyclohexyl-4-heptyloctylamine, cyclohexyl-2-ethylhexyloctylamine, 2-ethylhexyl-4-heptyloctylamine, tri-2-ethylhexylamine, di-2-ethylhexyl-methylamine, didecylethylamine, tridodecylamine, dodecyl-dibutylamine, dodecyl-diisobutylamine, dodecyl-isobutylmethylamine, diisopentadecyl-methylamine, diisopentadecyl-ethylamine, diisopentadecylisopropylamine, didocyl-methylamine and dodecyl-diisopropylamine.

10. The process of claim 9, wherein said solvents are selected from the group consisting of xylenes, cumol, cymols, ethylbenzene, trimethylbenzenes, 1,2,4-triethylbenzene, 1,3,5-triethylbenzene, 1,2,3,4-tetramethylbenzene, 1,2,3,5-tetramethylbenzene, 3-phenylpentane, dodecylbenzene, nonane, decane, undecane, dodecane, tetradecane, decalin and tetralin.

11. The process of claim 10, wherein said carboxylic acid chlorides are selected from the group consisting of acetic acid chloride, propionic acid chloride, butyric acid chloride, isobutyric acid chloride, valerianic acid chloride, isovalerianic acid chloride, pivalic acid chloride, capronic acid chloride, heptoic acid chloride, caprylic acid chloride, 2-ethylhexanoic acid chloride, pelargonic acid chloride, capric acid chloride, lauric acid chloride, myristic acid chloride, palmitic acid chloride, stearic acid chloride, benzoic acid chloride, toluyl acid chlorides, ethylbenzoic acid chlorides, dimethylbenzoic acid chlorides, trimethylbenzoic acid chlorides, tetramethylbenzoic acid chlorides, 1-naphthoic acid chloride, 2-naphthoic acid chloride, phenyl-acetic acid chloride, tolyl-acetic acid chloride, beta-phenylpropionic acid chloride, gamma-phenylbutyric acid chloride, delta-phenyl-valerianic acid chloride and beta-1-naphthyl-propionic acid chloride, arachidic acid chloride and behenic acid chloride.

* * * * *